United States Patent
Zheng et al.

(10) Patent No.: US 12,516,359 B2
(45) Date of Patent: Jan. 6, 2026

(54) NITRILASE MUTANT AND USE THEREOF IN CATALYTIC SYNTHESIS OF 2-CHLORONICOTINIC ACID

(71) Applicant: ZHEJIANG UNIVERSITY OF TECHNOLOGY, Zhejiang (CN)

(72) Inventors: Renchao Zheng, Hangzhou (CN); Andi Dai, Hangzhou (CN); Zheming Wu, Hangzhou (CN); Yuguo Zheng, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 418 days.

(21) Appl. No.: 18/018,561

(22) PCT Filed: Apr. 19, 2021

(86) PCT No.: PCT/CN2021/088232
§ 371 (c)(1),
(2) Date: Jan. 28, 2023

(87) PCT Pub. No.: WO2022/073331
PCT Pub. Date: Apr. 14, 2022

(65) Prior Publication Data
US 2025/0092432 A1  Mar. 20, 2025

(30) Foreign Application Priority Data
Oct. 9, 2020 (CN) .......................... 202011074098.7

(51) Int. Cl.
*C12P 17/12* (2006.01)
*C12N 9/78* (2006.01)
*C12P 7/42* (2006.01)

(52) U.S. Cl.
CPC ................ *C12P 17/12* (2013.01); *C12N 9/78* (2013.01); *C12P 7/42* (2013.01); *C12Y 305/05001* (2013.01)

(58) Field of Classification Search
CPC ... C12P 17/12; C12P 7/42; C12N 9/78; C12Y 305/05001
See application file for complete search history.

*Primary Examiner* — Delia M Ramirez
(74) *Attorney, Agent, or Firm* — Jiwen Chen; Joywin IP Law PLLC (57) ABSTRACT

The present invention discloses a nitrilase mutant and application thereof in catalytic synthesis of 2-chloronicotinic acid, and belongs to the technical field of enzyme engineering. The nitrilase mutant has an amino acid sequence shown in SEQ ID NO. 4, that is, 167th tryptophan W of a parent nitrilase is mutated into glycine G. According to the nitrilase mutant provided by the present invention, the hydration activity of the parent nitrilase to 2-chloronicotinonitrile is eliminated, a byproduct of 2-chloronicotinamide is not generated in the catalytic process, the nitrile hydrolysis activity is greatly improved, and 2-chloronicotinonitrile can be specifically subjected to catalytic hydrolysis to synthesize 2-chloronicotinic acid. Therefore, the nitrilase mutant has an important potential in enzymatic industrial synthesis of 2-chloronicotinic acid.

10 Claims, 2 Drawing Sheets
Specification includes a Sequence Listing.

SEQUENCE LISTING

```
<160> NUMBER OF SEQ ID NOS: 8

<210> SEQ ID NO 1
<211> LENGTH: 1104
<212> TYPE: DNA
<213> ORGANISM: Rhodococcus zopfii

<400> SEQUENCE: 1
atgggcgtgg aatatactaa taccttcaaa gtagctgctg ttcaggcaca acctgtgtgg      60
ttcgatgcag cgaagaccgt tgacaaaacg gtatctatca tcgccgaggc cgcacgtaac     120
ggttgcgagc tggtggcatt ccctgaagta ttcattccgg gctacccgta ccacatctgg     180
```

```
gtcgactctc cactggctgg tatggccaaa ttcgctgtac gctaccacga aaatagcctg      240
actatggact ccccgcacgt gcagcgtctg ctggatgcgg cccgtgacca caatatcgca      300
gttgttgttg gtatttctga acgtgatggt ggttctctgt acatgactca gctggttatt      360
gacgcggatg gtcaactggt ggctcgtcgt cgcaaactga aaccgactca cgtagaacgt      420
tctgtttacg gtgaaggcaa tggtagcgat atcagcgttt atgatatgcc attcgctcgt      480
ctgggcgcgc tgaactgctg gaacacttc cagaccctga ctaaatacgc gatgtatagc       540
atgcacgaac aggttcacgt ggcgagctgg ccgggtatgt ctctgtacca gccggaggta      600
ccggcatttg gcgtggacgc tcagctgacc gctacccgta tgtacgcgct ggaaggtcaa      660
accttcgttg tttgtaccac ccaagttgtt actccggaag cccatgaatt cttttgcgat      720
aacgatgaac agcgcaaact gatcggccgt ggcggcggtt tcgctcgtat cattggccca      780
gacggtcgtg acctggcaac gccgctggcc gaagacgaag agggtatcct gtatgcagac      840
atcgacctga gcgctattac cctggcaaaa caggccgccg accgggtcgg tcactactct      900
cgcccggacg ttctgtctct gaactttaac cagcgtcaca ccaccccagt aaataccgca      960
atttctacca ttcatgctac ccacactctg gtccctcagt ctggcgctct ggacggtgta     1020
cgcgagctga acggcgcgga cgagcagcgt gcgctgccgt ccactcacag cgacgagact     1080
gatcgtgcta ctgcctctat ctaa                                            1104
```

<210> SEQ ID NO 2
<211> LENGTH: 367
<212> TYPE: PRT
<213> ORGANISM: Rhodococcus zopfii

<400> SEQUENCE: 2

Met Gly Val Glu Tyr Thr Asn Thr Phe Lys Val Ala Ala Val Gln Ala
1               5                   10                  15

Gln Pro Val Trp Phe Asp Ala Ala Lys Thr Val Asp Lys Thr Val Ser
            20                  25                  30

Ile Ile Ala Glu Ala Ala Arg Asn Gly Cys Glu Leu Val Ala Phe Pro
        35                  40                  45

Glu Val Phe Ile Pro Gly Tyr Pro Tyr His Ile Trp Val Asp Ser Pro
    50                  55                  60

Leu Ala Gly Met Ala Lys Phe Ala Val Arg Tyr His Glu Asn Ser Leu
65                  70                  75                  80

Thr Met Asp Ser Pro His Val Gln Arg Leu Leu Asp Ala Ala Arg Asp
                85                  90                  95

His Asn Ile Ala Val Val Val Gly Ile Ser Glu Arg Asp Gly Gly Ser
            100                 105                 110

Leu Tyr Met Thr Gln Leu Val Ile Asp Ala Asp Gly Gln Leu Val Ala
        115                 120                 125

Arg Arg Arg Lys Leu Lys Pro Thr His Val Glu Arg Ser Val Tyr Gly
    130                 135                 140

Glu Gly Asn Gly Ser Asp Ile Ser Val Tyr Asp Met Pro Phe Ala Arg
145                 150                 155                 160

Leu Gly Ala Leu Asn Cys Trp Glu His Phe Gln Thr Leu Thr Lys Tyr
                165                 170                 175

Ala Met Tyr Ser Met His Glu Gln Val His Val Ala Ser Trp Pro Gly
            180                 185                 190

Met Ser Leu Tyr Gln Pro Glu Val Pro Ala Phe Gly Val Asp Ala Gln
        195                 200                 205

```
Leu Thr Ala Thr Arg Met Tyr Ala Leu Glu Gly Gln Thr Phe Val Val
210                 215                 220

Cys Thr Thr Gln Val Val Thr Pro Glu Ala His Glu Phe Phe Cys Asp
225                 230                 235                 240

Asn Asp Glu Gln Arg Lys Leu Ile Gly Arg Gly Gly Phe Ala Arg
                245                 250                 255

Ile Ile Gly Pro Asp Gly Arg Asp Leu Ala Thr Pro Leu Ala Glu Asp
            260                 265                 270

Glu Glu Gly Ile Leu Tyr Ala Asp Ile Asp Leu Ser Ala Ile Thr Leu
                275                 280                 285

Ala Lys Gln Ala Ala Asp Pro Val Gly His Tyr Ser Arg Pro Asp Val
290                 295                 300

Leu Ser Leu Asn Phe Asn Gln Arg His Thr Thr Pro Val Asn Thr Ala
305                 310                 315                 320

Ile Ser Thr Ile His Ala Thr His Thr Leu Val Pro Gln Ser Gly Ala
                325                 330                 335

Leu Asp Gly Val Arg Glu Leu Asn Gly Ala Asp Glu Gln Arg Ala Leu
                340                 345                 350

Pro Ser Thr His Ser Asp Glu Thr Asp Arg Ala Thr Ala Ser Ile
                355                 360                 365

<210> SEQ ID NO 3
<211> LENGTH: 1104
<212> TYPE: DNA
<213> ORGANISM: Artificial Sequence
<220> FEATURE:
<223> OTHER INFORMATION: Synthesized

<400> SEQUENCE: 3
atgggcgtgg aatatactaa taccttcaaa gtagctgctg ttcaggcaca acctgtgtgg      60
ttcgatgcag cgaagaccgt tgacaaaacg gtatctatca tcgccgaggc cgcacgtaac     120
ggttgcgagc tggtggcatt ccctgaagta ttcattccgg ctacccgta ccacatctgg      180 gtcgactctc cactggctgg tatggccaaa ttcgctgtac gctaccacga aaatagcctg     240
actatggact ccccgcacgt gcagcgtctg ctggatgcgg cccgtgacca caatatcgca     300
gttgttgttg gtatttctga acgtgatggt ggttctctgt acatgactca gctggttatt     360
gacgcggatg tcaactggt ggctcgtcgt cgcaaactga aaccgactca cgtagaacgt      420
tctgtttacg gtgaaggcaa tggtagcgat atcagcgttt atgatatgcc attcgctcgt     480
ctgggcgcgc tgaactgcgg cgaacacttc cagaccctga ctaaatacgc gatgtatagc     540
atgcacgaac aggttcacgt ggcgagctgg ccgggtatgt ctctgtacca gccggaggta     600
ccggcatttg gcgtggacgc tcagctgacc gctacccgta tgtacgcgct ggaaggtcaa     660
accttcgttg tttgtaccac ccaagttgtt actccggaag cccatgaatt cttttgcgat     720
aacgatgaac agcgcaaact gatcggccgt ggcggcggtt tcgctcgtat cattggccca     780
gacggtcgtg acctggcaac gccgctggcc gaagacgaag agggtatcct gtatgcagac     840
atcgacctga gcgctattac cctggcaaaa caggccgccg accoggtcgg tcactactct     900 cgcccggacg ttctgtctct gaactttaac cagcgtcaca ccaccccagt aaataccgca     960
atttctacca ttcatgctac ccacactctg gtccctcagt ctggcgctct ggacggtgta    1020
cgcgagctga acggcgcgga cgagcagcgt gcgctgccgt ccactcacag cgacgagact    1080
gatcgtgcta ctgcctctat ctaa                                          1104
```

```
<210> SEQ ID NO 4
<211> LENGTH: 367
<212> TYPE: PRT
<213> ORGANISM: Artificial Sequence
<220> FEATURE:
<223> OTHER INFORMATION: Synthesized

<400> SEQUENCE: 4

Met Gly Val Glu Tyr Thr Asn Thr Phe Lys Val Ala Ala Val Gln Ala
1               5                   10                  15

Gln Pro Val Trp Phe Asp Ala Ala Lys Thr Val Asp Lys Thr Val Ser
            20                  25                  30

Ile Ile Ala Glu Ala Ala Arg Asn Gly Cys Glu Leu Val Ala Phe Pro
        35                  40                  45

Glu Val Phe Ile Pro Gly Tyr Pro Tyr His Ile Trp Val Asp Ser Pro
    50                  55                  60

Leu Ala Gly Met Ala Lys Phe Ala Val Arg Tyr His Glu Asn Ser Leu
65                  70                  75                  80

Thr Met Asp Ser Pro His Val Gln Arg Leu Leu Asp Ala Ala Arg Asp
                85                  90                  95

His Asn Ile Ala Val Val Gly Ile Ser Glu Arg Asp Gly Gly Ser
            100                 105                 110

Leu Tyr Met Thr Gln Leu Val Ile Asp Ala Asp Gly Gln Leu Val Ala
        115                 120                 125

Arg Arg Arg Lys Leu Lys Pro Thr His Val Glu Arg Ser Val Tyr Gly
    130                 135                 140

Glu Gly Asn Gly Ser Asp Ile Ser Val Tyr Asp Met Pro Phe Ala Arg
145                 150                 155                 160

Leu Gly Ala Leu Asn Cys Gly Glu His Phe Gln Thr Leu Thr Lys Tyr
                165                 170                 175

Ala Met Tyr Ser Met His Glu Gln Val His Val Ala Ser Trp Pro Gly
            180                 185                 190

Met Ser Leu Tyr Gln Pro Glu Val Pro Ala Phe Gly Val Asp Ala Gln
        195                 200                 205

Leu Thr Ala Thr Arg Met Tyr Ala Leu Glu Gly Gln Thr Phe Val Val
    210                 215                 220

Cys Thr Thr Gln Val Val Thr Pro Glu Ala His Glu Phe Phe Cys Asp
225                 230                 235                 240

Asn Asp Glu Gln Arg Lys Leu Ile Gly Arg Gly Gly Phe Ala Arg
                245                 250                 255

Ile Ile Gly Pro Asp Gly Arg Asp Leu Ala Thr Pro Leu Ala Glu Asp
            260                 265                 270

Glu Glu Gly Ile Leu Tyr Ala Asp Ile Asp Leu Ser Ala Ile Thr Leu
        275                 280                 285

Ala Lys Gln Ala Ala Asp Pro Val Gly His Tyr Ser Arg Pro Asp Val
    290                 295                 300

Leu Ser Leu Asn Phe Asn Gln Arg His Thr Thr Pro Val Asn Thr Ala
305                 310                 315                 320

Ile Ser Thr Ile His Ala Thr His Thr Leu Val Pro Gln Ser Gly Ala
                325                 330                 335

Leu Asp Gly Val Arg Glu Leu Asn Gly Ala Asp Glu Gln Arg Ala Leu
            340                 345                 350

Pro Ser Thr His Ser Asp Glu Thr Asp Arg Ala Thr Ala Ser Ile
        355                 360                 365
```

```
<210> SEQ ID NO 5
<211> LENGTH: 20
<212> TYPE: DNA
<213> ORGANISM: Artificial Sequence
<220> FEATURE:
<223> OTHER INFORMATION: Synthesized

<400> SEQUENCE: 5
taatacgact cactataggg                                               20

<210> SEQ ID NO 6
<211> LENGTH: 20
<212> TYPE: DNA
<213> ORGANISM: Artificial Sequence
<220> FEATURE:
<223> OTHER INFORMATION: Synthesized

<400> SEQUENCE: 6
tgctagttat tgctcagcgg                                               20

<210> SEQ ID NO 7
<211> LENGTH: 33
<212> TYPE: DNA
<213> ORGANISM: Artificial Sequence
<220> FEATURE:
<223> OTHER INFORMATION: Synthesized
<220> FEATURE:
<221> NAME/KEY: misc_feature
<222> LOCATION: (16)..(17)
<223> OTHER INFORMATION: n is a, c, g or t

<400> SEQUENCE: 7
ggcgcgctga actgcnnkga acacttccag acc                                33

<210> SEQ ID NO 8
<211> LENGTH: 33
<212> TYPE: DNA
<213> ORGANISM: Artificial Sequence
<220> FEATURE:
<223> OTHER INFORMATION: Synthesized
<220> FEATURE:
<221> NAME/KEY: misc_feature
<222> LOCATION: (16)..(16)
<223> OTHER INFORMATION: m is a, c, g or t
<220> FEATURE:
<221> NAME/KEY: misc_feature
<222> LOCATION: (17)..(18)
<223> OTHER INFORMATION: n is a, c, g or t

<400> SEQUENCE: 8
ggtctggaag tgttcmnngc agttcagcgc gcc                                33
```

NITRILASE MUTANT AND USE THEREOF IN CATALYTIC SYNTHESIS OF 2-CHLORONICOTINIC ACID

This is a U.S. national stage application of PCT Application No. PCT/CN2021/088232 under 35 U.S.C. 371, filed Apr. 19, 2021 in Chinese, claiming priority of Chinese Application No. 202011074098.7, filed Oct. 9, 2020, all of which are hereby incorporated by reference.

FIELD OF TECHNOLOGY

The present invention relates to the technical field of enzyme engineering and mainly relates to a nitrilase mutant and application thereof in catalytic synthesis of 2-chloronicotinic acid.

BACKGROUND TECHNOLOGY 2-chloronicotinic acid is an important nitrogen heterocyclic fine chemical intermediate and widely used for synthesis of pesticides and pharmaceutical chemicals. In the field of pesticides, 2-chloronicotinic acid can be used for synthesizing a sulfonylurea herbicide nicosulfuron, an amide herbicide diflufenican, an amide fungicide boscalid and a triazolethione series fungicide active compound. In the field of medicines, 2-chloronicotinic acid can be used for synthesizing antibiotics and medicines for treating cardiovascular diseases, such as an anti-AIDS medicine Nevirapine, an antidepressant mirtazapine, an anti-inflammatory medicine pranoprofen, an anti-inflammatory analgesics niflumic acid, mefenamic acid and the like. Since 2-chloronicotinic acid is widely used in the pesticides and medicines, its market demand is increasing.

At present, 2-chloronicotinic acid is mainly produced by a chemical method including nicotinic acid nitrogen oxidation-chlorination-hydrolysis method, 3-cyanopyridine oxidation-chlorination-hydrolysis method, 3-methylpyridine chlorination-oxidation method, and alkenyl ether and ethyl cyanoacetate ring-forming method, etc. However, these methods have the disadvantages of severe reaction conditions, environmental pollution, high equipment requirements, and the like. Therefore, the development of a clean and efficient production technology for 2-chloronicotinic acid has an important industrial application value.

In recent years, breakthrough advances in the field of biotechnology have made biocatalysis play an increasingly important role in the chemical industry. The biocatalysis gradually becomes one of the most promising technologies for industrial sustainability. The biocatalysis of a nitrile compound for hydrolysis and hydration has the obvious advantages of high-efficient process, environmental friendliness, high chemoselectivity, regioselectivity, and stereoselectivity, and the like, becomes an important method for industrial synthesis of carboxylic acid and amide, and successfully realizes industrial synthesis of bulk and fine chemicals such as acrylamide, nicotinamide, and the like.

Nitrilase is capable of catalyzing the hydrolysis of a nitrile compound to the corresponding carboxylic acid and ammonia. However, so far, no nitrilase has been reported to be capable of hydrolyzing 2-chloronicotinonitrile into 2-chloronicotinic acid. Researches show that some nitrilases have a nitrile hydration activity at the same time and catalyze a nitrile compound to generate a corresponding amide. The nitrilase has the catalytic properties of both nitrile hydrolysis and nitrile hydration activity, which provides a new visual angle for the development of new functions of biological organic synthesis.

The molecular modification of protein is an effective means for regulating and controlling the catalytic properties of nitrilase, such that the problem needed to be solved by a person skill in the art is to develop a mutant capable of specifically hydrolyzing 2-chloronicotinonitrile to synthesize 2-chloronicotinic acid through the molecular modification and used for the biological organic synthesis of 2-chloronicotinic acid.

SUMMARY OF INVENTION

The object of the present invention is to modify a nitrilase from *Rhodococcus zopfii* by a protein engineering technology and to construct a mutant capable of specifically hydrolyzing 2-chloronicotinonitrile to synthesize 2-chloronicotinic acid. The mutant is of great significance for realizing efficient and green production of 2-chloronicotinic acid.

To achieve the above objective, the present invention uses the following technical solutions.

The present invention randomly mutates a coding gene (SEQ ID NO. 1) of nitrilase from *R. zopfii* by using an error-prone PCR technology, specifically, firstly, a T7 primer is used for PCR amplification, mutation is randomly introduced to obtain a nucleotide sequence of a nitrilase mutant, the nucleotide sequence is ligated to an expression vector pET-28b (+), the vector is introduced into a host *Escherichia coli*, after induced expression, and a mutant with reduced nitrile hydration activity and improved nitrile hydrolysis activity is obtained through high-throughput screening. It is found by a sequencing analysis that a Try167 in the nitrilase from *R. zopfii* shown in SEQ ID NO. 2 is mutated. A site-directed mutagenesis is combined to perform site-directed mutagenesis at position 167 to obtain a mutant with eliminated nitrile hydration activity and further improved nitrile hydrolysis activity, that is, a nitrilase mutant W167G capable of efficiently catalyzing 2-chloronicotinonitrile to synthesize 2-chloronicotinic acid.

The present invention provides a nitrilase mutant having an amino acid sequence shown in SEQ ID NO. 4, that is, Try 167 of a parent nitrilase having an amino acid sequence shown in SEQ ID NO. 2 is mutated into glycine G.

The present invention further provides a gene encoding the nitrilase mutant, wherein a nucleotide sequence of the gene is shown in SEQ ID No. 3.

The present invention further provides a recombinant plasmid containing the gene. Preferably, the original vector is pET-28b (+).

The present invention further provides a recombinant engineered bacterium comprising the recombinant plasmid. The recombinant plasmid is transformed into a host cell to obtain the recombinant engineered bacterium. The host cell can be a variety of conventional host cells in the art. Preferably, the host cell is *Escherichia coli* BL21 (DE3).

Another object of the present invention is to provide application of the nitrilase mutant in catalytic hydrolysis of 2-chloronicotinonitrile to synthesize 2-chloronicotinic acid.

The application comprises subjecting a recombinant engineered bacterium comprising a gene encoding the nitrilase mutant to induced expression to obtain a wet bacterial cell, subjecting an immobilized cell of the wet bacterial cell or the wet bacterial cell to ultrasonication, extracting a pure enzyme as a catalyst, forming a reaction system by using 2-chloronicotinonitrile as a substrate and a $NaH_2PO_4$—$Na_2HPO_4$ buffer solution with a pH value of 6-8 as a reaction medium, performing reaction at 25-45° C., and performing separation and purification to obtain 2-chloronicotinic acid after the reaction.

Preferably, in the reaction system, the amount of the catalyst is 0.2-3 g/L based on the dry weight of the bacterial cell, and the concentration of the substrate is 50-500 mM.

More preferably, the bacterial cell collected after the induced culture is used as the catalyst, the $NaH_2PO_4$—$Na_2HPO_4$ buffer solution with a concentration of 200 mM and a pH value of 7 is used as the reaction medium, in the reaction system, the concentration of the substrate 2-chloronicotinonitrile is 300 mM, the bacterial cell is 2 g/L (by dry weight), and the reaction is performed at 30° C. for 30-40 hours.

A preparation method of the wet bacterial cell is as follows: inoculating an engineered bacterium containing a nitrilase mutant gene into an LB liquid medium containing 50 μg/mL of kanamycin, culturing the bacterium at 37° C. and 200 rpm overnight, transferring the bacterium to a fresh LB liquid medium containing 50 μg/mL of kanamycin with an inoculum size of 2% (volume concentration), culturing the bacterium at 37° C. and 180 rpm until a concentration $OD_{600}$ of the bacterial cell is 0.4-0.8, adding IPTG with a final concentration of 0.1-1 mM to the medium, and performing induced culture at 28° C. and 180 rpm for 12 hours. A fermentation broth is centrifuged at 4° C. and 8,000 rpm for 10 min and the bacterial cell is collected. The LB liquid medium consists of 10 g/L of peptone, 5 g/L of a yeast extract, and 10 g/L of NaCl, with a pH of 7.0.

The present invention has the following beneficial effects:

According to the nitrilase mutant W167G provided by the present invention, the hydration activity of the parent nitrilase to 2-chloronicotinonitrile is eliminated, a byproduct of 2-chloronicotinamide is not generated in the catalytic process, the nitrile hydrolysis activity is greatly improved, and 2-chloronicotinonitrile can be specifically subjected to catalytic hydrolysis to synthesize 2-chloronicotinic acid. Therefore, the nitrilase mutant has an important potential in enzymatic industrial synthesis of 2-chloronicotinic acid.

DETAILED DESCRIPTION OF THE EMBODIMENTS

The present invention is further described below in conjunction with the specific examples, but the protection scope of the present invention is not limited thereto.

Example 1 Construction of Nitrilase Mutant Library

A pET-RZ plasmid containing a nitrilase gene (nucleotide sequence SEQ ID NO. 1 and amino acid sequence SEQ ID NO. 2) from *Rhodococcus zopfii* was used as a template, primers T7 F and T7 R (Table 1) were used for PCR amplification, and the mutation was introduced randomly.

PCR reaction system (50 μL): 0.5-20 ng of template pET-RZ, 1×Taq Buffer (without $Mg^{2+}$), 0.2 mM of dNTP, 0.3 mM of $MnCl_2$, 2 mM of $MgCl_2$, 0.2 μM of each of upstream and downstream primers T7 F and T7 R, and 5 U of a Taq DNA polymerase.

PCR conditions: (1) pre-denaturation at 95° C. for 5 min; (2) denaturation at 95° C. for 15 s; (3) annealing at 60° C. for 5 s; (4) extension at 72° C. for 30 s, and a total of 30 cycles of steps (2)-(4); and (5) finally, extension at 72° C. for 3 min and preservation at 4° C.

A PCR product was analyzed by an agarose gel electrophoresis and a gel was cut for recovery.

Subsequently, the gel recovery product was used as primers for amplification to obtain complete a plasmid.

PCR system (50 μL): 2×Phanta Max buffer, 0.2 mM of dNTPs, 2.5 U of a Phanta Max high-fidelity polymerase, 50 ng of the gel recovery product, and 20 ng of the pET RZ plasmid.

PCR conditions: (1) pre-denaturation at 95° C. for 5 min; (2) denaturation at 95° C. for 15 seconds, annealing at 60° C. for 5 seconds, and extension at 72° C. for 3.5 min, and a total of 35 cycles of step (2); and (3) finally, extension at 72° C. for 5 min and preservation at 4° C.

The amplified PCR product was digested by an endonuclease DpnI at 37° C. for 3 hours, the enzyme was inactivated at 65° C. for 10 min, and the digested product was transformed into *E. coli* BL21 (DE3) which was coated on an LB plate containing kanamycin (50 μg/mL) and cultured overnight at 37° C.

TABLE 1

Primer design

| Name of primers | Sequence of primers (5' to 3') |
|---|---|
| T7 F | TAATACGACTCACTATAGGG (SEQ ID NO: 5) |
| T7 R | TGCTAGTTATTGCTCAGCGG (SEQ ID NO: 6) |
| W167 F | GGCGCGCTGAACTGCNNKGA ACACTTCCAGACC (SEQ ID NO: 7) |
| W167 R | GGTCTGGAAGTGTTCMNNGC AGTTCAGCGCGCC (SEQ ID NO: 8) |

Example 2 High-Throughput Screening of Mutants

A single colony in example 1 was picked and cultured in a 96-deep well plate, 1 mL of an LB culture medium (containing kanamycin at a final concentration of 50 μg/mL) was added to each well plate, the bacteria were cultured at 37° C. for 12 hours, 200 μL of a bacterial solution was transferred to 800 μL of a fresh LB medium (at final concentration of 50 μg/mL of kanamycin, 0.1 mM IPTG), and the bacteria were cultured at 28° C. for 18 hours. The bacterial cells in the 96-deep well plate were centrifuged for 30 min (3,000 rpm, 4° C.), the supernatant was discarded, the residue was washed with a $NaH_2PO_4$—$Na_2HPO_4$ buffer solution (200 mM, pH 7.0), and the bacterial cells were resuspended with 600 μL of the buffer solution. A substrate 2-chloronicotinonitrile (at a final concentration of 100 mM) was added into each well and reaction was performed at 30° C. for 12 hours. After the reaction, a reaction solution in the 96-deep well plate was centrifuged for 30 min (3,000 rpm, 4° C.), 20 μL of a supernatant was transferred to a 96-well micro-reaction plate where each well contains 150 μL of a mixed solution of phthalaldehyde and mercaptoethanol, and the plate was placed at 37° C. for insulation for 30 min. The fluorescence intensity was measured with a microplate reader (excitation wavelength of 412 nm and emission wavelength of 467 nm). The stronger fluorescence indicated the higher nitrile hydrolysis activity and produced more $NH_3$ and 2-chloronicotinic acid. After verification by a liquid chromatography, a sequence analysis was performed. A mobile phase of the liquid chromatography is acetonitrile:water:phosphoric acid=250:750:1, the flow rate is 1 mL/min, and the detection wavelength is 210 nm. A mutant W167A (Table 2) was obtained by screening, that is, the codon at position 167 was mutated from TGG to GCC.

Example 3 Site-Directed Mutagenesis

A plasmid pET-W167A was used as a template for site-directed mutagenesis by full plasmid amplification.

PCR system (50 μL): 0.5-20 ng of a template pET-W167A, 10-15 pmol of each of primers W167 F and W167 R, 2×Phanta Max buffer, 0.2 mM of dNTP, and 2.5 U of Phanta Max high-fidelity polymerase.

PCR conditions: (1) pre-denaturation at 95° C. for 5 min; (2) denaturation at 95° C. for 15 s, annealing at 60° C. for 5 s, and extension at 72° C. for 3.5 min, and a total of 35 cycles of step (2); and (3) finally, extension at 72° C. for 5 min and preservation at 4° C.

The amplified PCR product was digested by an endonuclease DpnI at 37° C. for 3 h, the enzyme was inactivated at 65° C. for 10 min, and the digested product was transformed into E. coli BL21 (DE3) which was coated on an LB plate containing kanamycin (50 μg/mL) and cultured overnight at 37° C.

A total of 200-300 monoclones were generated by saturation mutagenesis at position 167, and after sequencing, all 20 kinds of natural amino acids were included.

After preliminary screening by the high-throughput screening method in example 2, secondary screening and verification were performed by using liquid chromatography. It was determined that the mutants without nitrile hydration activity and with improved nitrile hydrolysis activity were W167S (i.e. the codon at position 167 mutated from TGG to TCC), W167C (i.e. the codon at position 167 mutated from TGG to TGC), and W167G (i.e. the codon at position 167 mutated from TGG to GGC), as shown in Table 2.

Figure 1:
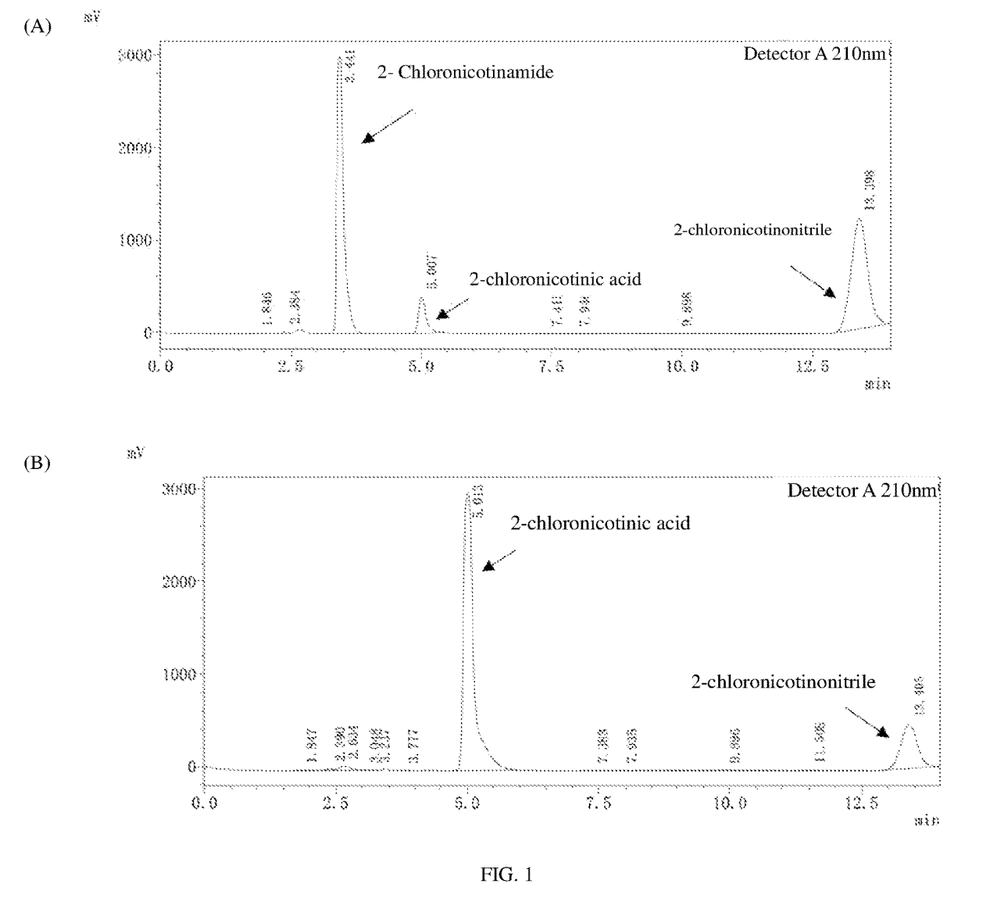
FIG. 1 is an HPLC analysis spectrum of a reaction product of catalysis of 2-chloronicotinonitrile by a parent nitrilase (A) and a mutant W167G (B)

The parent nitrilase had the hydratase activity when hydrolyzing 2-chloronicotinonitrile, and produced a large amount of a byproduct of 2-chloronicotinamide (FIG. 1A). The modified mutant W167G only had the hydrolase activity, and did not produce the by-product of 2-chloronicotinamide (FIG. 1B).

TABLE 2

Comparison of relative activity of nitrilase

| Mutants | Proportion of amide (%) | Relative activity (%) |
|---------|------------------------|----------------------|
| WT      | 90.55                  | 100                  |
| W167A   | 0.54                   | 185                  |
| W167S   | 0                      | 427                  |
| W167C   | 0                      | 459                  |
| W167G   | 0                      | 2052                 |

Example 4 Induction and Expression of Nitrilase

10 μL of the bacterial solution preserved in a glycerin tube was inoculated into 10 mL of a liquid LB medium (containing 50 μg/mL of kanamycin) and cultured at 37° C. and 200 rpm overnight, the cultured bacteria were transferred to 100 mL of a fresh LB medium (containing 50 μg/mL kanamycin) with an inoculum size of 2% and continuously cultured until $OD_{600}$ was 0.4-0.8, IPTG with a final concentration of 0.1 mM was added, and the bacteria were subjected to induced culture at 28° C. for 12 hours. After the culture, the bacterial cells were collected by centrifugation at 8,000 rpm and 4° C. for 10 min and washed twice with 0.9% normal saline to obtain wet bacterial cells.

Example 5 Preparation of 2-Chloronicotinic Acid by Using Recombinant Nitrilase Mutant The collected wet bacterial cells of the preferred mutant W167G in example 3 subjected to the induced culture by using the method in example 4 were used as a catalyst to be added into the reaction system (total system: 10 mL, and substrate: 300 mM of 2-chloronicotinonitrile, 200 mM of a $NaH_2PO_4$—$Na_2HPO_4$ buffer solution at a pH of 7, and 0.02 g of bacterial cells (dry weight)), and reaction was performed at 30° C. 100 μL of the reaction solution was sampled at regular intervals, 10 μL of 6 M HCl was added to terminate the reaction, and the content of the product was determined by HPLC.

Figure 2:
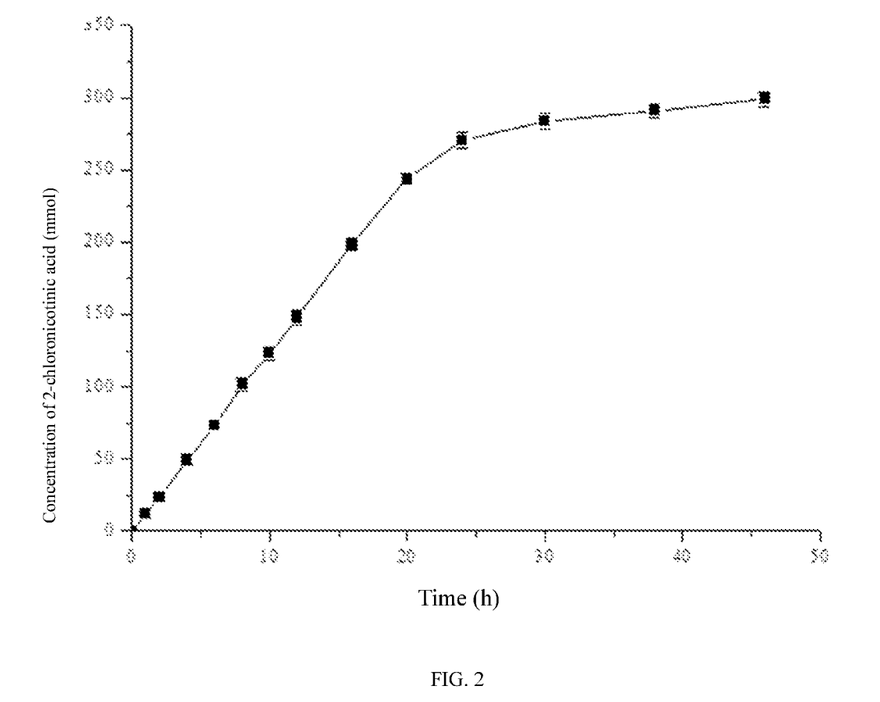
FIG. 2 shows the progress of the hydrolysis reaction of 300 mM of 2-chloronicotinonitrile catalyzed by the mutant W167G.

It can be seen from FIG. 2 that the mutant W167G can completely convert 300 mM of the substrate 2-chloronicotinonitrile into 2-chloronicotinic acid.

What is claimed is:

1. A nitrilase mutant having the amino acid sequence of SEQ ID NO: 4.

2. A gene having the nucleotide sequence of SEQ ID NO: 3.

3. A recombinant plasmid comprising the gene according to claim 2.

4. The recombinant plasmid according to claim 3, wherein the recombinant plasmid is a pET-28b (+) vector that comprises the gene.

5. A recombinant engineered bacterium comprising the recombinant plasmid according to claim 3.

6. The recombinant engineered bacterium according to claim 5, wherein the recombinant engineered bacterium is a *Escherichia coli* BL21 cell that comprises the recombinant plasmid.

7. A method of catalytic hydrolysis of 2-chloronicotinonitrile to synthesize 2-chloronicotinic acid, comprising:
   culturing a cell transformed with a nucleic acid encoding the protein of SEQ ID NO: 4 to express the protein of SEQ ID NO: 4;
   sonicating the cell to obtain the protein of SEQ ID NO: 4;
   reacting the protein of SEQ ID NO: 4 with 2-chloronicotinonitrile in a reaction medium that is a $NaH_2PO_4$—$Na_2HPO_4$ buffer solution at a pH between 6 and 8 at a temperature of 25-45° C. to produce 2-chloronicotinic acid, and
   purifying the 2-chloronicotinic acid.

8. The method according to claim 7, wherein the concentration of 2-chloronicotinonitrile in the reaction medium is 50-500 mM.

9. The method according to claim 8, wherein the $NaH_2PO_4$—$Na_2HPO_4$ buffer solution used as the reaction medium has a pH value of 7, the concentration of 2-chloronicotinonitrile in the reaction medium is 300 mM, and the reaction is performed at 30° C. for 30-40 hours.

10. A recombinant engineered bacterium comprising the recombinant plasmid according to claim 4.

* * * * *